(12) United States Patent
Matsushita et al.

(10) Patent No.: US 7,539,409 B2
(45) Date of Patent: May 26, 2009

(54) CAMERA HAVING CROSS-SHAPED OPERATION MEMBER

(75) Inventors: Takeshi Matsushita, Tokyo (JP); Toshihiro Hamamura, Tokyo (JP)

(73) Assignee: Hoya Corporation, Tokyo (JP)

( * ) Notice: Subject to any disclaimer, the term of this patent is extended or adjusted under 35 U.S.C. 154(b) by 465 days.

(21) Appl. No.: 11/208,590

(22) Filed: Aug. 23, 2005

(65) Prior Publication Data

US 2006/0045514 A1 Mar. 2, 2006

(30) Foreign Application Priority Data

Aug. 24, 2004 (JP) .......................... P2004-243658

(51) Int. Cl.
*G03B 17/18* (2006.01)
(52) U.S. Cl. .................. 396/287; 396/299; 396/429; 348/211.4; 348/211.7; 348/333.01; 348/333.02; 348/333.06
(58) Field of Classification Search ................ 396/299, 396/287, 429; 348/211.4, 211.7, 333.01, 348/333.02, 333.06
See application file for complete search history.

(56) References Cited

U.S. PATENT DOCUMENTS

| | | | | |
|---|---|---|---|---|
| 5,189,466 A | * | 2/1993 | Yasukawa et al. ............ 396/299 |
| 5,198,851 A | * | 3/1993 | Ogawa ........................ 396/211 |
| 5,479,206 A | * | 12/1995 | Ueno et al. ............... 348/211.5 |
| 5,745,809 A | * | 4/1998 | Kawahata .................... 396/287 |
| 5,790,094 A | * | 8/1998 | Tanigawa et al. ............. 715/823 |
| 5,845,166 A | * | 12/1998 | Fellegara et al. ............. 396/429 |
| 6,122,005 A | * | 9/2000 | Sasaki et al. .............. 348/211.3 |
| 6,134,606 A | * | 10/2000 | Anderson et al. ............. 710/14 |
| 2002/0176709 A1 | * | 11/2002 | Umetsu et al. ............... 396/287 |
| 2003/0064757 A1 | * | 4/2003 | Yamadera et al. ............ 455/566 |
| 2005/0254811 A1 | * | 11/2005 | Taneoka ...................... 396/287 |

FOREIGN PATENT DOCUMENTS

JP 2002-281373 9/2002

OTHER PUBLICATIONS

English Language Abstract of JP 2002-281373.
U.S. Appl. No. 10/765,989 to Tatamiya, filed Jan. 29, 2004.

* cited by examiner

*Primary Examiner*—Christopher E Mahoney
*Assistant Examiner*—Michael A Strieb
(74) *Attorney, Agent, or Firm*—Greenblum & Bernstein, P.L.C.

(57) ABSTRACT

A camera has an operation member and a display processor. The operation member is operated to select specific camera information from a series of camera information associated with a photograph. The display processor displays the plurality of setting items with a captured image on a display. The operation member has a first selecting member and a second selecting member. The firs t selecting member is operated to designate a setting item along a first direction in order, and in accordance with the arrangement of the plurality of setting items. The second selecting member is opposite to the first selecting member, and is operated to designate a setting item in order along a second direction, which is opposite to the first direction. The display processor performs a selection-display process to express a setting item selected by an operation of the first selecting member or second selecting member.

6 Claims, 9 Drawing Sheets

CAMERA HAVING CROSS-SHAPED OPERATION MEMBER

BACKGROUND OF THE INVENTION

1. Field of the Invention

This invention relates to a camera that is capable of displaying an object image on a monitor, especially, it relates to a display process for selecting photograph conditions such as a white balance, image quality.

2. Description of the Related Art

In a digital camera, a display such as an LCD is provided on the back surface of the camera, and photograph conditions such as a white balance, strobe photograph mode, shooting mode, and so on, can be displayed using icons with an object image. A user can select and set photograph conditions by operating a button, for example, a cross-shaped button or four-way controller. For each photograph condition, the user selects one setting item from a plurality of setting items. For example, a series of white balance modes is prepared in advance, and one white balance mode is selected. When displaying a screen for selecting and setting an item from a series of items, the user selects one setting item while operating a button that shifts a selected item along only one-way (for example, only the left or right direction).

SUMMARY OF THE INVENTION

An object of the present invention is to provide a camera that has an excellent user-interface with respect to a selecting-operation for setting a photograph function or photograph condition.

A camera has an operation member and a display processor. The operation member is operated to select specific camera information from a series of camera information associated with a photograph. Each type of camera information has a plurality of setting items. The display processor displays the plurality of setting items on a display. For example, the display processor displays the setting items with a captured image on the display. An arrangement of the plurality of setting items is defined.

In the present invention, the operation member has a first selecting member and a second selecting member. The first selecting member is operated to designate a setting item arranged along a first direction, in order, and in accordance with the arrangement of the plurality of setting items. The second selecting member is opposite to the first selecting member, and is operated to designate a setting item along a second direction that is opposite to the first direction, in order, and in accordance with the arrangement of the plural setting items. Then, the display processor performs a selection-display process to express or display a setting item selected by an operation of the first selecting member or second selecting member.

BRIEF DESCRIPTION OF THE DRAWINGS

The present invention will be better understood from the description of the preferred embodiments of the invention set fourth below together with the accompanying drawings, in which.

DESCRIPTION OF THE PREFERRED EMBODIMENTS

Hereinafter, the preferred embodiments of the present invention are described with reference to the attached drawings.

Figure 1:
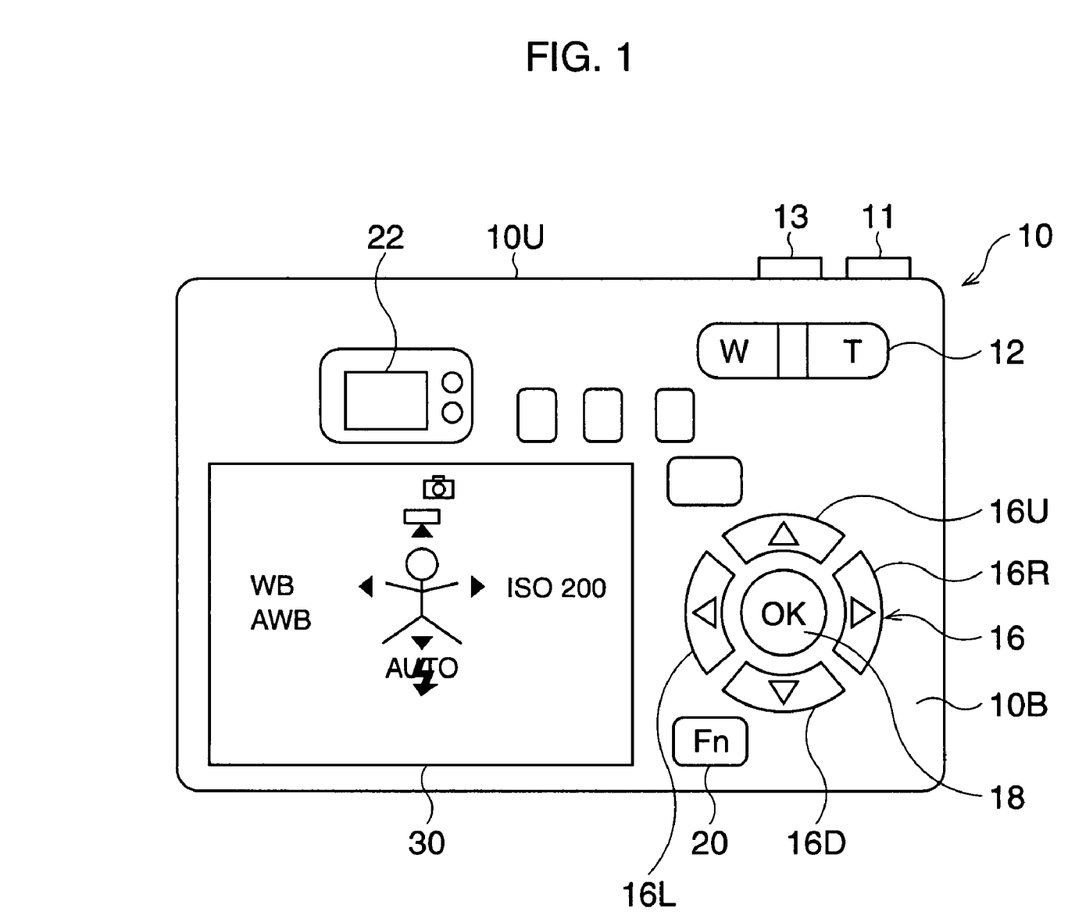
FIG. 1 is a rear view of a digital camera according to a first embodiment.

FIG. 1 is a rear view of a digital camera according to a first embodiment.

A plurality of buttons, operated by a user, is provided on a rear surface 10B of a digital camera 10; a zoom button 12, a function button 20, an OK button 18, and a cross-shaped button or four-way controller 16, which is constructed of an up-button 16U, a down-button 16D, a right-button 16R, and a left-button 16L, are provided. Further, an LCD monitor 30, which is capable of displaying an object image as a movie/still image and character information such as literal information or an icon, and so on, is provided on the rear surface 10B. A finder 22 is provided above the LCD monitor 30. On an upper surface 10U of the digital camera 10, a main button 11 and a release button 13 are provided. An object image is recorded by operating the release button 13, and the camera 10 is tuned ON/OFF by operating the main button 11.

Figure 2:
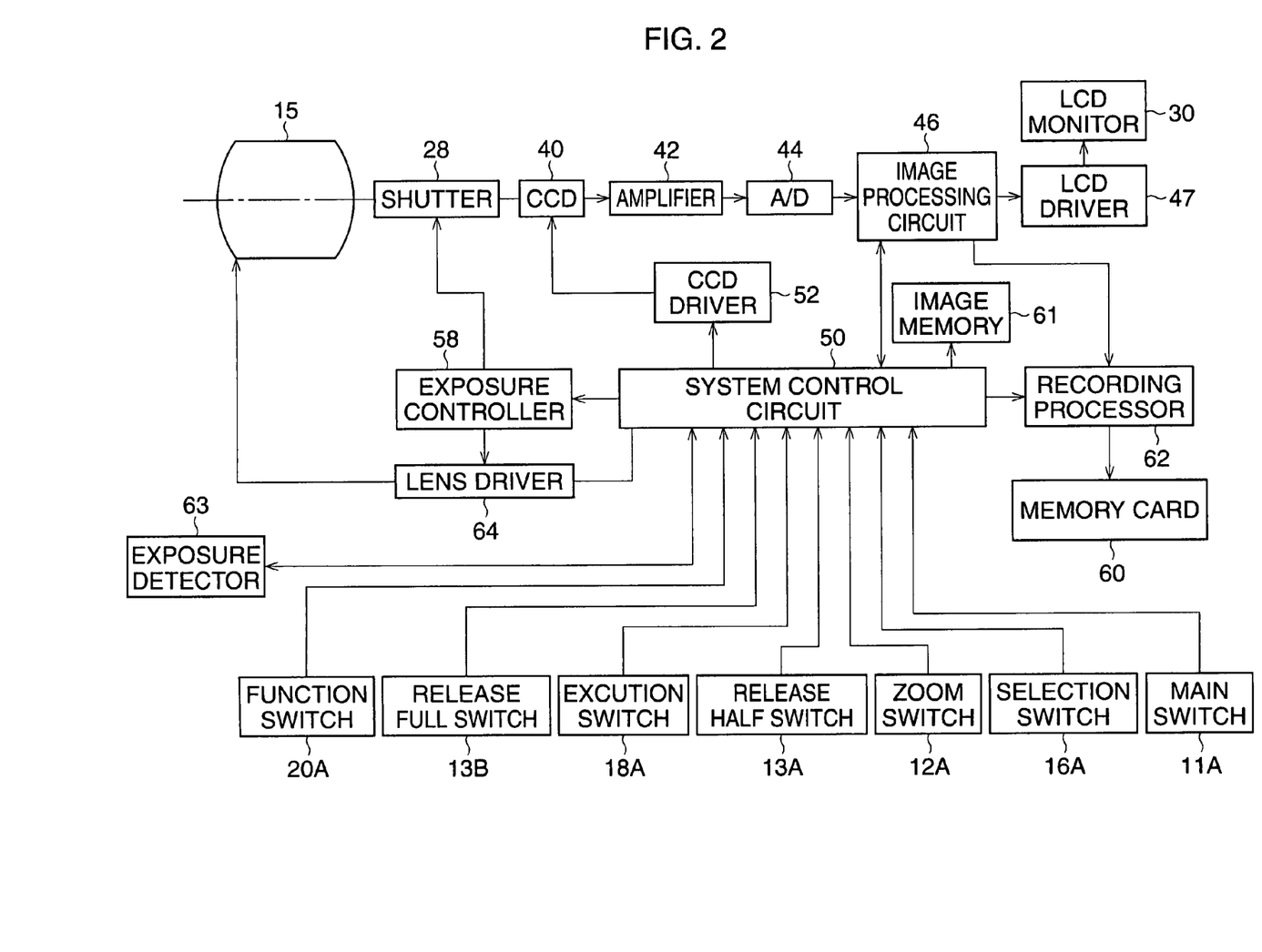
FIG. 2 is a block diagram of the camera 10.

FIG. 2 is a block diagram of the camera 10. A system control circuit 50 including a CPU, controls the digital camera 10, and a main switch 11A, a zoom switch 12A, a release half switch 13A, a release full switch 13B, a selection switch 16A, and an execution switch 18A are connected to the system control circuit 50.

When a photograph mode is selected, a signal process is performed to display a movie image on the LCD monitor 30. An object image is formed on a photo-receiving area of a CCD 40 by a photographing optical system 15 so that analog image-pixel signals corresponding to the object image are generated in the CCD 40. The image-pixel signals are read from the CCD 40 by a CCD driver 52, and are fed to an amplifier 42. The read image-pixel signals are amplified in the amplifier 42, and are then converted to digital signals in an A/D converter 44.

The digital signals are subjected to various processes, such as a white balance process, a gamma process, and so on, in an image processing circuit 46, and are temporarily stored in a frame memory (not shown). The stored digital signals are output to an LCD driver 47, which drives the LCD monitor 30 on the basis of the digital signals. Thus, the object image is displayed on the LCD monitor 30 as a movie image.

When the release button 13 is depressed halfway, the release half switch 13A is turned ON so that an exposure detector 63 detects a brightness of an object and a distance from the object to the camera 10. Further, when the release button 13 is depressed fully, the release full switch 13B is turned ON so that the full depression of the release button 13 is detected. Then, a focusing lens in the photographing optical system 14 is driven by a lens driver 64 to focus an object image, and a shutter 28 opens at a given opening-degree and for a given time-interval on the basis of a control signal output from the system control circuit 50. The lens driver 64 and the shutter 28 are controlled by an exposure controller 58.

One frame worth of image-pixel signals corresponding to the object image are read from the CCD 40 by depressing the release button 13 fully, and are subjected to processes in the amplifier 42, the A/D converter 44, and the image processing circuit 46. Then, the generated digital signals are fed to a recording processor 62 via the system control circuit 50. The digital signals are compressed in the recording processor 62 and compressed image data is recorded in a memory card 60.

When a playback mode is selected, the compressed image data is read from the memory card 60 and are subjected to an expanding-process so that the digital image signals are reproduced. Then, the digital image signals are fed to the image processing circuit 46 and then to the LCD driver 47. The LCD driver 47 controls the LCD monitor 30 so that the recorded still image is displayed on the LCD monitor 30. In an image memory 61, camera information including photograph conditions is recorded in advance.

When the function button 20 is operated, as described later, the system control circuit 50 detects the operation of the function button 20, and controls the image processing circuit 46 such that a series of photograph conditions or photograph functions are simultaneously displayed on the LCD monitor 30 with the object image. Further, when a specific photograph condition is selected and determined from the series of photograph conditions, the system control circuit 50 controls the image processing circuit 46 such that a screen for setting a setting item, such as a specific photograph mode or photograph method, and so on, is displayed on the LCD monitor 30. In the image processing circuit 46, an image process that superimposes character information, such as icon, or literal information, on the object image, is carried out. When the cross-shaped button 16 is operated for selecting a given photograph condition or setting item, the system control circuit 50 controls the image processing circuit 46 in accordance with a signal detected by the selection switch 16A.

Figure 3:
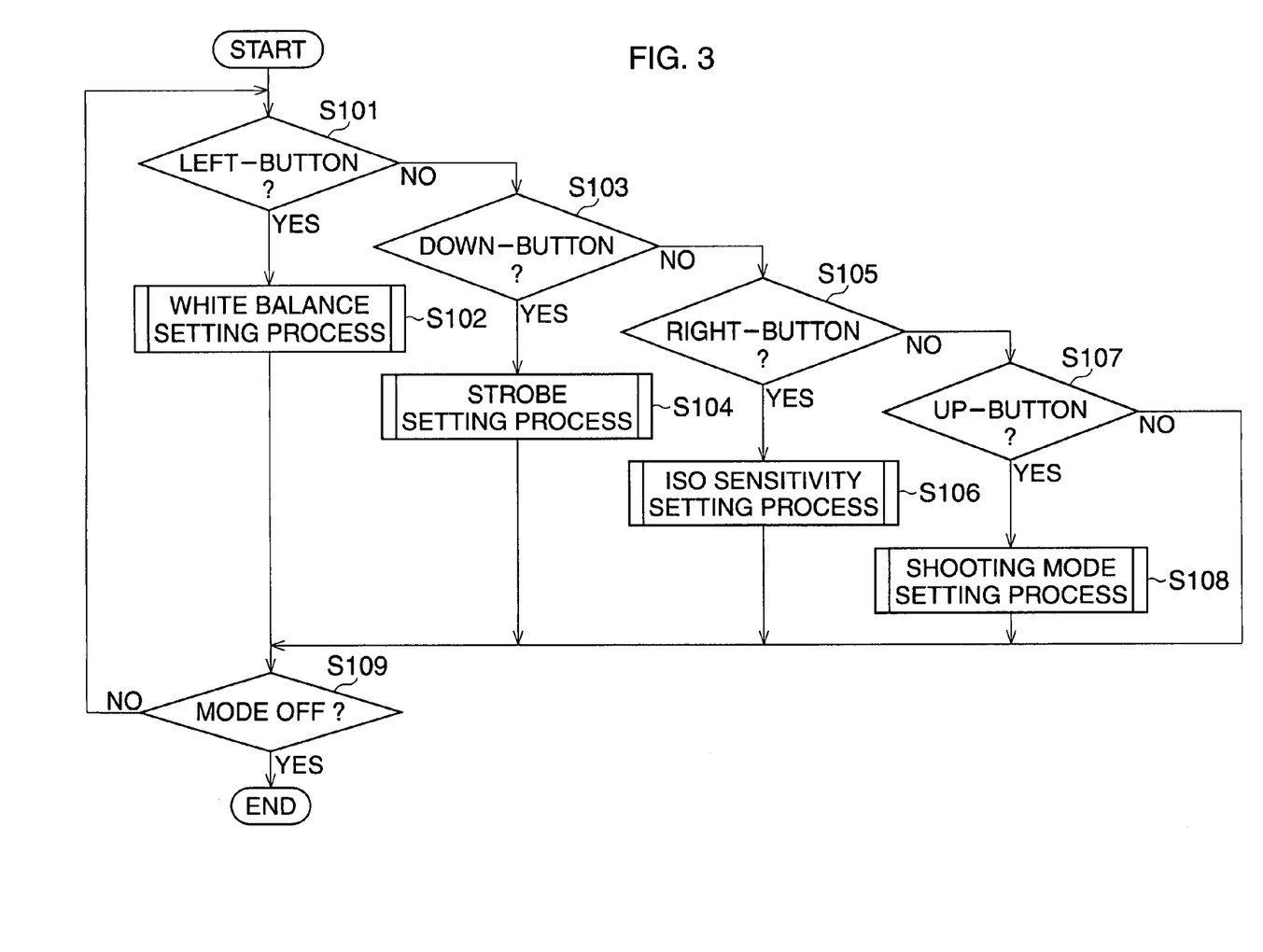
FIG. 3 is a flowchart of a selecting process.
Figure 4:
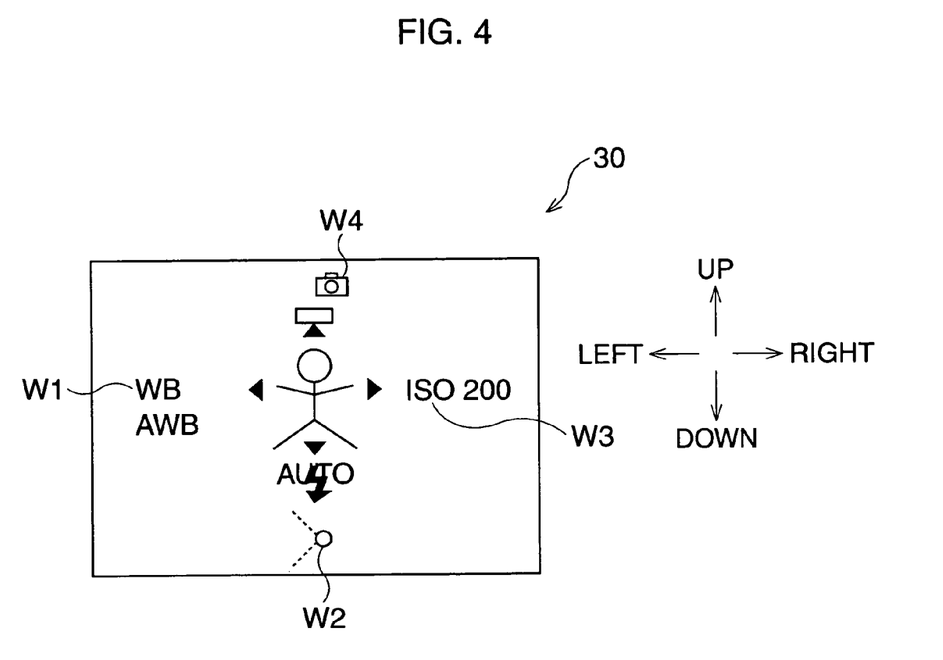
FIG. 4 is a view showing a selecting screen for selecting a specific photograph condition.

FIG. 3 is a flowchart of a selecting process. FIG. 4 is a view showing a selecting screen for selecting a specific photograph condition. When the function button 20 is operated, the process is started.

When the function button 20 is operated, as shown in FIG. 4, character information representing four photograph functions, a white balance W1, a strobe photograph W2, an ISO sensitivity W3, and a shooting method W4 are displayed on the LCD monitor 30. The four photograph functions W1 to W4 are simultaneously displayed in a cross-shape so as to match the cross-shaped button 16, and each photograph function is constructed of a plurality of setting items. Further, a selected setting item is displayed in each photograph function.

In Step S101, it is determined whether the left-button 16L is depressed. When it is determined that the left-button 16L is depressed, the process goes to Step S102, wherein a setting process associated with the white balance is performed. On the other hand, when it is determined that the left-button 16L is not depressed, the process goes to Step S103.

In Step S103, it is determined whether the down-button 16D is depressed. When it is determined that the down-button 16D is depressed, the process goes to Step S104, wherein a setting process associated with the strobe photograph is performed. On the other hand, when it is determined that the down-button 16D is not depressed, the process goes to Step S105.

In Step S105, it is determined whether the right-button 16R is depressed. When it is determined that the right-button 16R is depressed, the process goes to Step S106, wherein a setting process associated with the ISO sensitivity is performed. On the other hand, when it is determined that the right-button 16R is not depressed, the process goes to Step S107.

In Step S107, it is determined whether the up-button 16U is depressed. When it is determined that the up-button 16U is depressed, the process goes to Step S108, wherein a setting process associated with the shooting method is performed. On the other hand, when it is determined that the up-button 16U is not depressed, the process goes to Step S109.

In Step S109, it is determined whether a setting mode for the photograph condition is terminated by depressing the function button 20 or the OX button 18. When it is determined that the setting mode for the photograph condition is terminated, the selecting process is terminated. On the other hand, when it is determined that the setting mode for the photograph condition is not terminated, the process returns to Step S101.

Figure 5:
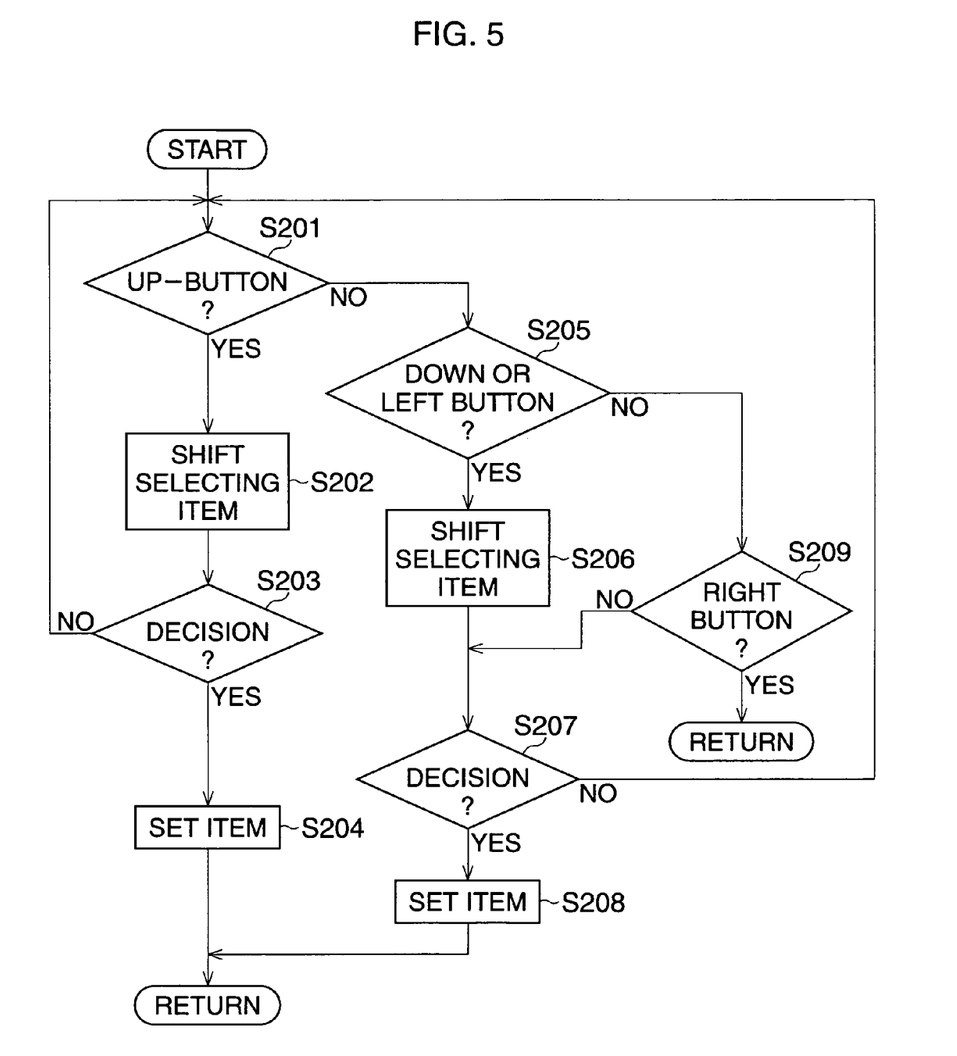
FIG. 5 is a view showing a subroutine of Step S102 in FIG. 3.
Figure 6:
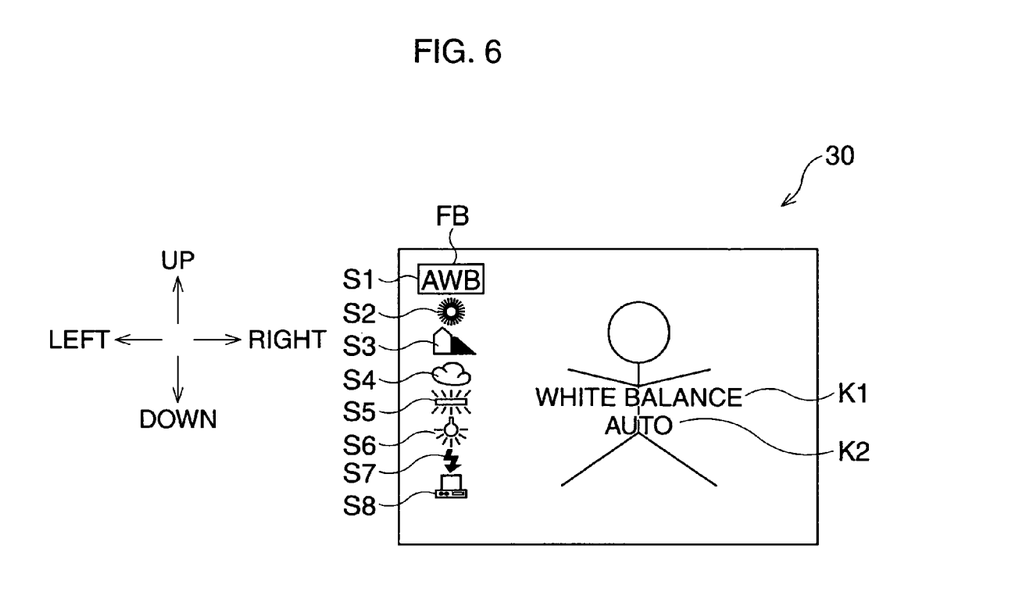
FIG. 6 is a view showing a selecting screen for setting the white balance mode.

FIG. 5 is a view showing a subroutine of Step S102 in FIG. 3. FIG. 6 is a view showing a selecting screen for setting the white balance mode.

As shown in FIG. 6, the screen for selecting and determining one setting item is displayed to perform the white balance setting process, and eight setting items S1 to S8 are displayed by icons, along a longitudinal direction (up to down direction) of the screen. Namely, the items S1 to S8 are displayed along a direction perpendicular to an operation-direction of the left-button 16L, which is operated to display the screen shown in FIG. 6. Note that, the operation-direction is defined by a line passing an operated button and an opposite button. For example, when the left button 16L is operated, the operation-direction corresponds to a right and left direction on the cross-shaped button 16.

Herein, eight types of white balance modes, including an auto white balance S1, a daylight white balance S2, . . . , can be selected. The array-order of the eight-setting items S1 to S8 are defined in advance. The user selects one white balance type on the basis of the photograph place, and so on. To clarify a selected setting item, a frame FB, which surrounds the selected setting item, is displayed. Herein, the auto white balance that automatically performs a white balance process is selected. Further, literal information "WHITE BALANCE" K1 and literal information K2 (herein, "AUTO") are displayed to indicate a selected photograph function and a selected setting item at present.

In Step S201, it is determined whether the up-button 16U is depressed. When it is determined that the up-button 16U is depressed, the process goes to Step S202, wherein the frame FB is shifted so as to surround a neighboring item, which is above the selected item. Namely, the selected item is changed to the above neighboring item by depression of the up-button 16U. Note, when the frame FB surrounds the highest-ranking item, namely, when the auto white balance S1 is selected before the up-button 16U is depressed, the frame FB is shifted to the lowest-ranking item. After Step S202 is performed, the process goes to Step S203.

In Step S203, it is determined whether the OK button 18 is depressed to determine a selected setting item surrounded by the frame FB. When it is determined that the OK button 18 is depressed, the process goes to Step S204, wherein a selected setting item is set, namely, the white balance mode is determined. After Step S204 is performed, the process is terminated. On the other hand, when it is determined that the OK button 18 is not depressed, the process returns to Step S201.

On the other hand, when it is determined that the up-button 16U is not depressed in Step S201, the process goes to Step S205, wherein it is determined whether the down-button 16D or the left-button 16L is depressed. When it is determined that the down-button 16D or the left-button 16L is depressed, the process goes to Step S206, wherein the frame FB is shifted so as to surround a neighboring setting item. Namely, the selected setting item is changed to the setting item one below the current one by depression of the down-button 16D or the left-button 16L. Note that, the operation of the left-button 16L herein shifts a selected setting item in order toward the bottom direction.

The performances of Step S207 and S208 are the same as the performances of Step S203 and S204. Namely, it is determined whether the OK button 18 is depressed, and the white balance mode is set to the selected item when the OK button 18 is depressed. After Step S208 is performed, the process is terminated.

On the other hand, when it is determined that the down-button 16D or the left-button 16L is not depressed in Step S205, the process goes to Step S209, wherein it is determined whether the right-button 16R is depressed to returns the selecting screen shown in FIG. 4. When it is determined that the right-button 16R is depressed, the process is terminated. On the other hand, when it is determined that the right-button 16R is not depressed, the process goes to Step S207.

Figure 7:
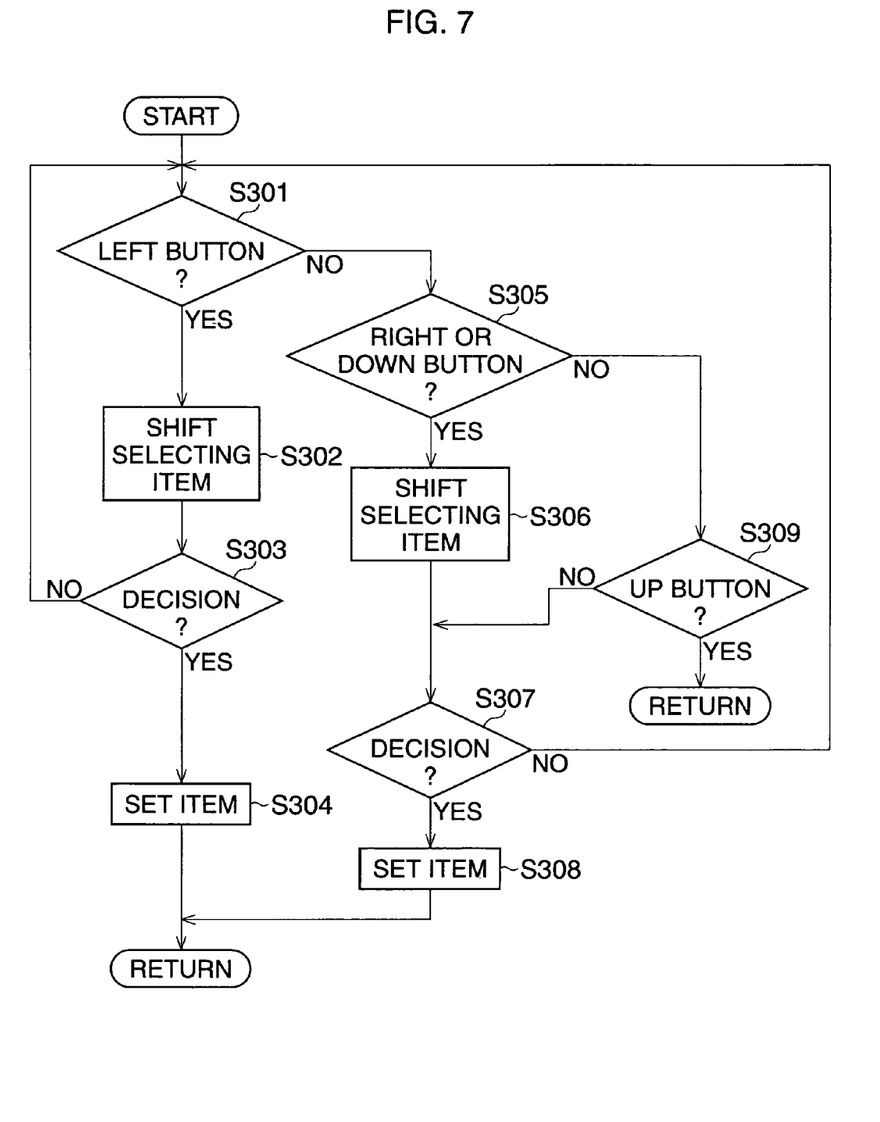
FIG. 7 is a view showing a subroutine of Step S104 in FIG. 3.
Figure 8:
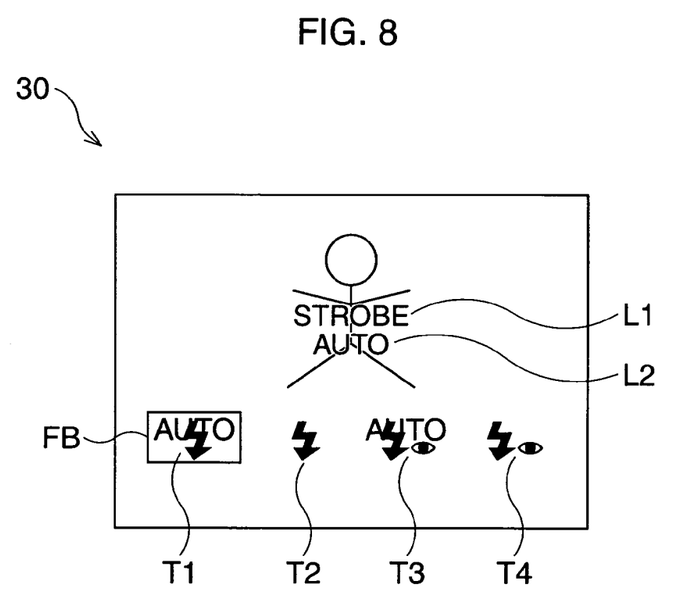
FIG. 8 is a view showing a screen for setting the strobe photograph mode.

FIG. 7 is a view showing a subroutine of Step S104 in FIG. 3. FIG. 8 is a view showing a screen for setting the strobe photograph mode.

As shown in FIG. 8, when the down-button 16 D is depressed to display the screen for setting the strobe photograph mode, the four setting items T1 to T4 are represented by icons, and are simultaneously displayed along the lateral direction. Namely, the setting items T1 to T4 are displayed along a direction perpendicular to an operation-direction of the down-button 16D, which is operated to display the screen shown in FIG. 8. In this case, the operation-direction corresponds to up and down direction on the cross-shaped button 16.

Herein, an auto-strobe T1, a compelled flash T2, . . . , can be selected. Then, the frame FB is displayed so as to surround the selected setting item. In FIG. 8, the auto-strobe is selected. Also, to clarify the selected setting item, the literal information "strobe" L1 is displayed and the setting item surrounded by the frame FB is displayed as the literal information L2. Herein, the auto-strobe is selected.

In Step S301, it is determined whether the left-button 16L is depressed. When it is determined that the left-button 16L is depressed, the process goes to Step S302, wherein the frame FB is shifted so as to surround a neighboring setting item. Namely, the selected item is changed to the next neighboring item on the left by depression of the left-button 16L. Note, when the frame FB surrounds the item displayed at the left-most position, the frame FB is shifted to the item displayed at the right-most position. After Step S302 is performed, the process goes to Step S303.

In Step S303, it is determined whether the OK button 18 is depressed to determine a selected setting item surrounded by the frame FB. When it is determined that the OK button 18 is depressed, the process goes to Step S304, where in a selected item is set. After Step S304 is performed, the process is terminated. On the other hand, when it is determined that the OK button 18 is not depressed, the process returns to Step S301.

On the other hand, when it is determined that the left-button 16L is not depressed in Step S301, the process goes to Step S305, wherein it is determined whether the right-button 16R or the down-button 16D is depressed. When it is determined that the right-button 16R or the down-button 16D is depressed, the process goes to Step S306, wherein the frame FB is shifted so as to surround a neighboring setting item. Namely, the selected setting item is changed to one right neighboring item by depression of the right-button 16R or the down-button 16D. Note that, the operation of the down-button 16D herein shifts a selected item in order toward right direction.

The performances of Step S307 and S308 are the same as the performances of Step S303 and S304. Namely, it is determined whether the OK button 18 is depressed, and the strobe mode is set to the selected item when the OK button 18 is depressed. After Step S308 is performed, the process is terminated.

On the other hand, when it is determined that the right-button 16R or the down-button 16D is not depressed in Step S305, the process goes to Step S309, wherein it is determined whether the up-button 16U is depressed to return to the selecting screen shown in FIG. 4. When it is determined that the up-button 16U is depressed, the process is terminated. On the other hand, when it is determined that the up-button 16U is not depressed, the process goes to Step S307.

Figure 9:
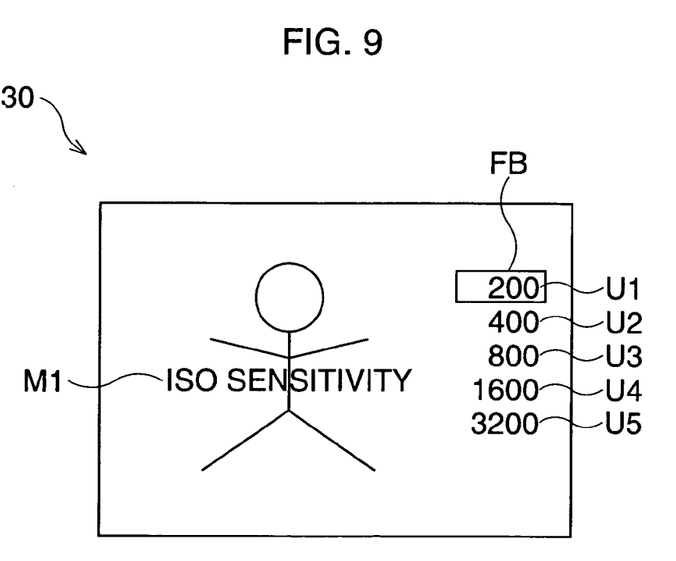
FIG. 9 is a view showing a screen for setting the ISO sensitivity.

FIG. 9 is a view showing a screen for setting the ISO sensitivity.

As shown in FIG. 9, a screen is displayed for selecting and determining one setting item for the ISO sensitivity, and five setting items U1 to U5 are displayed by numerals, along a longitudinal direction (up to down direction) of the screen. Namely, the items U1 to U5 are displayed along a direction perpendicular to an operation-direction of the right-button 16R, which is operated to display the screen shown in FIG. 9. Herein, four values, "200", "400", "800", "1600", and "3200" can be selected. The user selects one value on the basis of the place where the photograph is taken, and so on. To clarify a selected setting item, the frame FB, which surrounds the selected setting item, is displayed. Herein, "200" is selected. Further, literal information "ISO sensitivity" M1 is displayed to indicate a selected photograph function.

When the right-button 16R is depressed in a situation where the screen shown in FIG. 4 is displayed, the screen shown in FIG. 9 is displayed. Then, the ISO sensitivity is set by the operation of the cross-shaped button 16 and the OK button 18. The performance of the ISO sensitivity setting process is the same as that of the white balance setting process shown in FIG. 5. Note, in Step S205, it is determined whether the right-button 16R (not left-button 16L) is depressed, in Step S209, it is determined whether the left-button 16L (not right-button 16R) is depressed.

Figure 10:
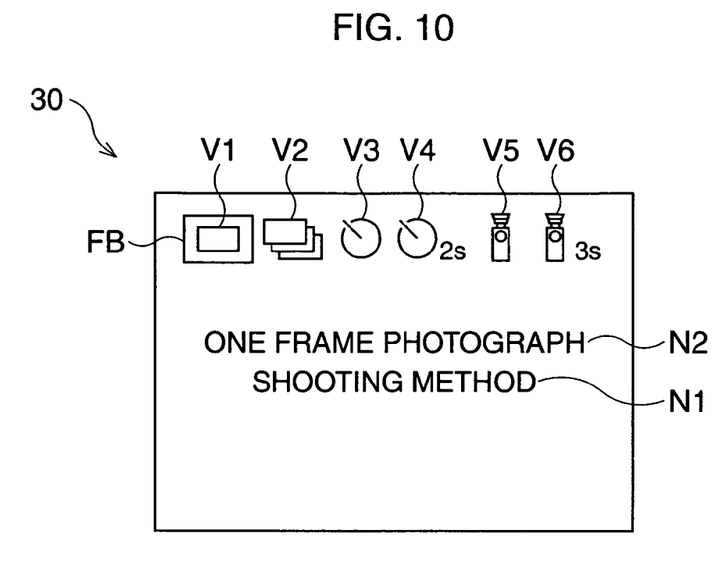
FIG. 10 is a view showing a screen for setting the shooting method.

FIG. 10 is a view showing a screen for setting the shooting method.

As shown in FIG. 10, the screen is displayed for selecting and determining one setting item is displayed for the shooting method, and six setting items U1 to U6 are displayed by icons, along a lateral direction (left to right direction) of the screen. Namely, the setting items U1 to U6 are displayed along a direction perpendicular to an operation-direction of the up-button 16U, which is operated to display the screen shown in FIG. 10. Herein, one frame photograph V1, a consecutive photograph V2, and so on, scan be selected. The user selects one type on the basis of the photograph location, and so on. To clarify a selected setting item, the frame FB, which surrounds the selected setting item, is displayed. Herein, "one frame photograph" is selected. Further, literal information "SHOOTING METHOD" N1 and "ONE FRAME PHOTOGRAPH" N2 are displayed to indicate a selected photograph function and a selected item at present.

When the up-button 16U is depressed in a situation where the screen shown in FIG. 4 is displayed, the screen shown in FIG. 10 is displayed. Then, the shooting method is set by the operation of the cross-shaped button 16 and the OK button 18. The performance of the shooting method setting process is the same as that of the strobe setting process shown in FIG. 7. Note that, in, Step S305, it is determined whether the up-button 16U (not down-button 16D) is depressed, and in Step S309, it is determined whether the down-button 16D (not up-button 16U) is depressed.

In this way, in this embodiment, the screen for selecting and setting the setting item is displayed. On the screen, character information associated with the setting items are superimposed on the object image. The setting item is selected along two-directions, namely, an up and down direction or a left or right direction, so that the user can rapidly selects a specific setting item. Since the array-order of the setting items are perpendicular with respect to a button that is operated to select one photograph function, the setting operation of the setting item and the selecting operation of the photograph function can be independently carried out. Note that, the photograph conditions or functions W1 to W4 do not have to be displayed on the LCD monitor 30.

Figure 11:
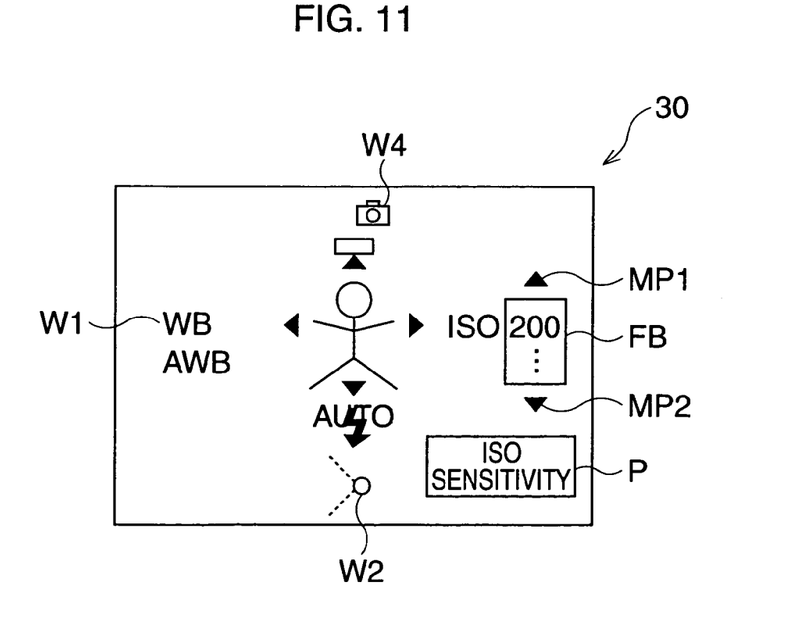
FIG. 11 is a view showing a screen for selecting a setting item according to the second embodiment.

With reference to FIG. 11, a second embodiment is explained. The second embodiment is different from the first embodiment in that a setting item is displayed one by one.

FIG. 11 is a view showing a screen for selecting a setting item according to the second embodiment. As shown in FIG. 11, when one photograph condition is selected, the frame FB that surrounds a selected setting item is displayed without changing the screen, as shown in the first embodiment. Then, to inform the user of buttons to be operated, a mark MP1 corresponding to the up-button 16U and a mark MP2 corresponding to the down-button 16D are displayed. Further, to inform the user of the selected photograph function, literal information P (herein, ISO sensitivity) is displayed. When the white balance is selected, marks corresponding to the up and down buttons are displayed around the character information W1. On the other hand, when the shooting method, or the strobe photograph is selected, marks corresponding to the left and right buttons are displayed.

Other photograph conditions or photograph functions associated with a photograph, which have a series of setting items may be selected and determined. Other types of cameras may be applied instead of a digital still camera. For an operation member, other operation members that have a pair of buttons opposite to each other and are capable of designating setting items in a given direction may be applied instead of the cross-shaped button or the four-way controller.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 2004-243658 (filed on Aug. 24, 2004), which is expressly incorporated herein, by reference, in its entirety.

The invention claimed is:

1. A camera, comprising:
   a cross-shaped operation member including an up-button, a down-button, a left-button and a right-button, the left-button and the right-button being arranged perpendicular to the up-button and the down-button; and
   a display processor that displays icons corresponding to setting modes of the camera on a display in an arrangement corresponding to the buttons of the cross-shaped operation member,
   wherein each of the buttons of the cross-shaped operation member is adapted to select one of the setting modes,
   when a button of the cross-shaped operation member is operated to select one of the setting modes, the display processor displays at least one setting item corresponding to the selected setting mode,
   the display processor displays the setting items along a direction perpendicular to an operation direction of the operated button,
   and the buttons which are arranged perpendicular to the operated button and the operated button are adapted to select one of the displayed setting items.

2. The camera of claim 1, wherein said display processor simultaneously displays the plurality of setting items, and displays the selected setting item so as to distinguish the selected setting item from the other setting items.

3. The camera of claim 1, wherein said display processor displays only the selected setting item.

4. The camera of claim 1, wherein said display processor displays literal information corresponding to the setting modes.

5. The camera of claim 1, wherein said display processor displays the plurality of setting items as literal information.

6. The camera of claim 1, wherein the setting modes relate to photograph conditions.

* * * * *